Nov. 16, 1948.　　　G. H. FLOYD, JR　　　2,454,049
ELECTRIC CAPACITOR
Filed Feb. 4, 1944
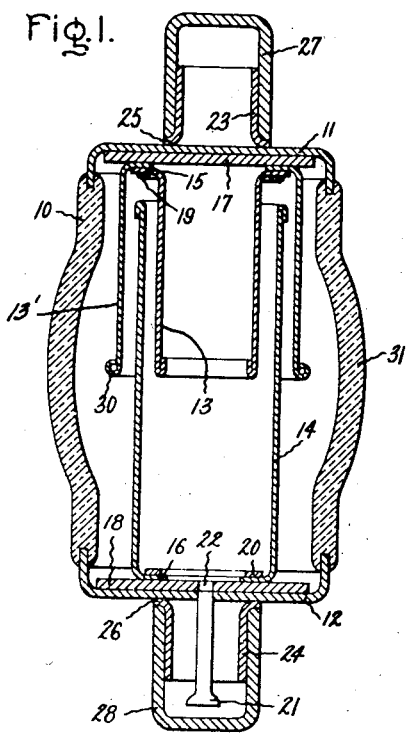
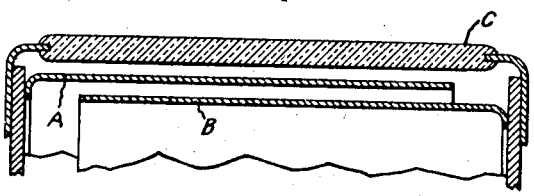
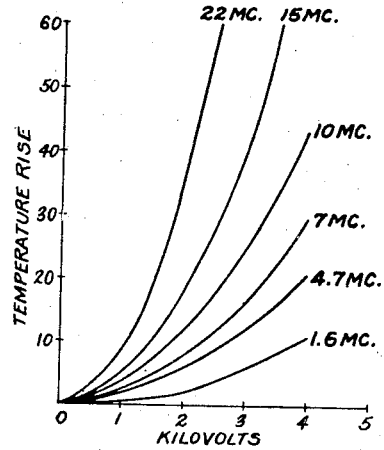
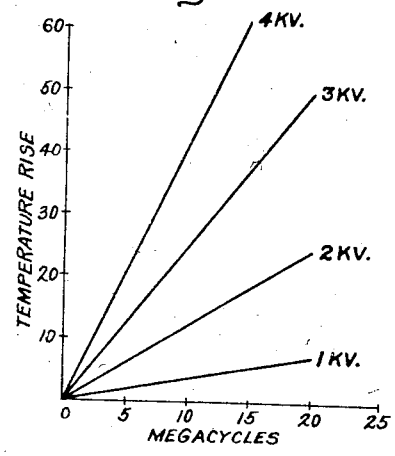
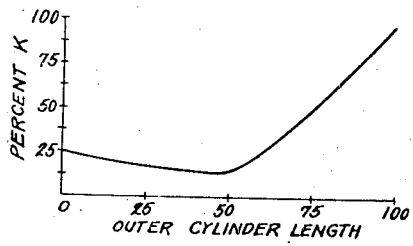
Inventor:
George H. Floyd, Jr.,
by Harry E. Dunham
His Attorney.

Patented Nov. 16, 1948

2,454,049

UNITED STATES PATENT OFFICE 2,454,049

ELECTRIC CAPACITOR

George H. Floyd, Jr., Schenectady, N. Y., assignor to General Electric Company, a corporation of New York Application February 4, 1944, Serial No. 521,079

2 Claims. (Cl. 175—41)

My invention relates to electric capacitors, and to capacitors of the type which are arranged in an evacuated housing and which have application to high frequency circuits.

Heretofore capacitors have been formed, such as those which have particular application in high frequency apparatus, which include a plurality of concentric radially spaced overlapping cylinders which are placed in an evacuated container, such as a tubular glass housing. Metallic end caps are sealed to the opposite ends of the housing and the tubular electrodes are secured at one end to one of the end caps, the adjacent of the electrodes being secured to opposite of the end caps. Terminals are placed on the outer surface of the end caps and the voltage impressed across the terminals is therefore placed across the electrodes. Such a capacitor is described and claimed in Patent 2,339,663, Teare, issued January 18, 1944, and which is assigned to the same assignee as this present invention.

The above described capacitor construction is very efficient and sturdy type capacitor but when the operative conditions, such as impressed voltage, are raised above a certain value, depending upon the size of the capacitor, the glass housing may become heated and may puncture, thus destroying the vacuum of the capacitor.

It is therefore an object of my invention to provide an improved capacitor of the above-mentioned type which is efficient in operation and which may be run at a relatively higher operating voltage.

A further object of my invention is to provide an improved capacitor construction which will have a relatively lower ionic loss in the insulating housing which enclosed the electrodes.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a sectional side elevation of a capacitor which is formed according to my invention; Fig. 2 is a view of a portion of the capacitor formed according to prior constructions, and Figs. 3, 4, and 5 include curves which l be used in the description of my invention.

Referring to Fig 1 of the drawing, I have lustrated an electric capacitor which includes a ontainer formed by a member 10 having a substantially cylindrical and somewhat convex shape with end caps 11 and 12 at opposite ends thereof.

The cylinder 10 may be formed of any suitable material, such as a borosilicate glass or a ceramic material, and the end caps 11 and 12 may be formed of any suitable metallic material such as one including an alloy of iron, nickle and cobalt, and having expansion characteristics which match the particular glass or ceramic material so that the peripheries of the end caps 11 and 12 may be sealed into the edges of the cylinder 10 to provide an hermetically sealed container arrangement.

Supported from the inner surface of the end caps 11 and 12 are a plurality of axially centered and concentrically spaced tubular or cylindrical electrodes, 13, 13' and 14. The electrodes extending outwardly toward each other from the opposite end cap are telescopically interleaved in spaced relation. In the construction illustrated in Fig. 1, two cylinders 13 and 13' are shown as attached to the end cap 11 and one cylinder 14 to the end cap 12, but it is to be understood that any suitable number of electrodes may be provided. The length of the electrode cylinders is chosen in accordance with the capacity desired but in any event the outermost electrode cylinder should be approximately one-half the length of the insulating container and, as shown in the drawing, the next adjacent electrode cylinder is longer than the outermost electrode cylinder.

During the manufacture of the electrode elements each is provided with flanges 15 and 16 for the electrodes 13 and 14, respectively. These flanges are attached in any suitable manner to the end caps as by spot welding to suitable backing discs 17 and 18. Thus one end of the electrodes 13, 13' is attached to the backing plate 17, the inner electrodes 13 having an outwardly positioned flange and an outer electrode 13' having an inwardly extending flange. Thus one flange may be placed on top of the other and spot welded to the backing plate 17 with a reinforcing ring 19 on top of the flanges so as to rigidly support the electrodes. The inwardly extending flange 16 is also spot welded to the backing plate 18 and a reinforcing ring 20 is provided adjacent the flange 16.

One of the end caps, such as 12, is provided with an exhaust tube 21 which is shown as sealed off and which communicates with the interior of the container through an opening 22 provided in the backing disc 18.

Extending outwardly from the opposite end caps 11 and 12 are cylindrical members 23 and 24 which are provided with end flanges 25 and 26, respectively, by which they are secured such as by spot welding or brazing to the corresponding end cap. Inverted cup-shaped elements 27 and 28 fitting closely over the cylindrical members 23 and 24, respectively are secured thereto in any suitable manner such as by soldering to form symmetrical end terminals for the device. The cup-shaped terminal element 20 it will be observed encloses the sealed-off exhaust tube 21 thereby improving the appearance of the device.

Such a construction as described above is described and claimed in the above-mentioned Teare patent, and although it provides a very simple, convenient, and rugged capacitor construction, I have found that under severe operating conditions such as under high voltage conditions the glass container will become hot and may puncture. Thus referring to Fig. 2, I have shown a construction of the type described in the above-mentioned Teare patent which includes concentric tubular electrodes A and B. Under the severe operative conditions existing in the illustrated construction the glass tube may puncture due to ionic loss heating in the vicinity of the outer edge of the outer electrode A as marked by the letter C. The heating is apparently due to a high frequency field which produces a voltage in the glass and a subsequent ionic current which heats the glass. The voltage across the capacitor may be determined by the approximate formula $$V = \frac{I}{2\pi f C} \quad (1)$$

Assuming a constant capacitance Equation 1 may be simplified into $$V = \frac{KI}{f} \quad (2)$$

Fig. 3 shows curves of temperature rise in degrees centigrade versus kilovolts for the construction as is shown in Fig. 2. The temperature rise is the rise over ambient temperature experienced by the glass on the end of the capacitor adjacent the free end of the outer electrode or at C. It will be noted that the curves are given for different frequencies and the higher the frequency the higher the temperature for a predetermined voltage. Thus the temperature rise may be written as $$T = K' \times V^2 \quad (3)$$

In formula 3 the constant K' is a constant that changes with frequency. By solving this constant K' it can be shown that $K' = K'' \times$ frequency. Such characteristics are shown in Fig. 4 in which degrees temperature rise is plotted against different frequencies at various voltages.

Thus we may say $$T = K''' f V^2 \quad (4)$$

where

T is the temperature rise above ambient temperature of the glass on the hot end of the capacitor,
K''' is the ionic loss constant for any one type of capacitor,
f is the frequency of the radio-frequency voltage applied, and
V is the radio-frequency voltage across the capacitor.

The only controllable factor in this formula is the constant and I have found that this varies with the chemical composition of the glass and the geometry of the capacitor.

In order therefore to provide a capacitor of the above-mentioned type which will have a minimum of heating or in which the constant K will be a relatively low value, I have found that this constant may be lowered by terminating the outer electrode 13' adjacent the center of the glass cylinder or in the vicinity of the center region. Further, the end 30 of the outer cylinder is rolled over so as to provide a smooth contour and provide a minimum concentration of stress which is set up in the glass. In order to further decrease the ionic loss constant of the capacitor the glass bulb in the center is bulged as indicated at 31 so that the end 30 will be further away from the glass bulb than is the supported end. The glass bulb may be bulged in any suitable amount and in the construction illustrated in Fig. 1 the bulge 31 is sufficient to cause the distance from the edge 30 radially to the inner surface of the glass to be about twice the distance between the electrode 13' and the glass cylinder at the supported end of the electrode.

In order to illustrate the effect of different lengths of the outer cylinder with a construction as is illustrated in Fig. 1 I have plotted in Fig. 5 the relative values of the ionic loss constant in per cent as a function of the outer length of the cylinder or the per cent of full length. It is assumed that when the outer cylinder is full length with the construction as is illustrated in Fig. 2, the constant is 100 per cent. When the outer cylinder 13' is half length as illustrated in Fig. 1, the dielectric loss constants is about ⅛, and when the cylinder has been shrunk so that it is no longer present as outer cylinder then the cylinder 14 becomes the outer cylinder and the dielectric loss constant is equal to 25 per cent of that when the cylinder 13' is full length. It will be seen that when the outer cylinder 13' is shrunk to zero the glass at the supported end is now twice the distance from the end of the inner cylinder 13 than it would be from the outer cylinder 13' and as heating in the glass varies inversely as the square of distance from the source of the radio-frequency field, this latter case will be ¼ of the value as when the outer cylinder is full length.

It will be seen from a close inspection of Fig. 5 that the minimum loss is not exactly at 50 per cent of full length but at slightly less than that as it appears that the concentration of the field is slightly in advance of the free end but it may be said that the minimum constant is when the outer cylinder terminates at approximately the center and when the bluge center is used for the glass. In case the straight glass container were used in the type shown in Fig. 2 the constant K''' would be one-half for a half length cylinder than for a full length cylinder and for the outer cylinder shrunk to zero the constant would be one-fourth that of the full length cylinder.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. An electric capacitor including a pair of concentrically arranged overlapping cylindrical electrodes, an envelope for said capacitor including a cylinder of insulating material and conductive means sealed to opposite ends of said cylindrical member and connected respectively with said cylindrical electrodes, said electrodes being of substantially different axial lengths with the longer of said electrodes arranged within the shorter electrode, said shorter electrode terminating substantially midway between the ends of said cylindrical insulator.

2. An electric capacitor including a pair of concentrically arranged overlapping cylindrical electrodes, an envelope for said capacitor including a cylinder of insulating material having a central bulbous portion of greater diameter than the ends thereof and conductive means sealed to opposite ends of said cylindrical member and connected respectively with said cylindrical electrodes, said electrodes being of substantially different axial lengths with the longer of said electrodes arranged within the shorter electrode, said shorter electrode terminating substantially midway between the ends of said cylindrical insulator in the region of maximum diameter of said cylinder of insulating material.

GEORGE H. FLOYD, Jr.

REFERENCES CITED

The following references are of record in the file of this patent:

UNITED STATES PATENTS

| Number | Name | Date |
|---|---|---|
| 1,510,341 | Proctor | Sept. 30, 1924 |
| 1,870,141 | Regerbis | Aug. 2, 1932 |
| 1,956,368 | Wilde | Apr. 24, 1934 |
| 1,983,371 | Hillebrand | Dec. 4, 1934 |
| 2,119,070 | Bouwers | May 31, 1938 |
| 2,339,663 | Teare | Jan. 18, 1944 |